(12) United States Patent
Birk et al.

(10) Patent No.: US 6,611,643 B2
(45) Date of Patent: Aug. 26, 2003

(54) ILLUMINATING DEVICE AND MICROSCOPE

(75) Inventors: Holger Birk, Meckesheim (DE); Rafael Storz, Bammental (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 69 days.

(21) Appl. No.: 09/881,046

(22) Filed: Jun. 15, 2001

(65) Prior Publication Data

US 2002/0009260 A1 Jan. 24, 2002

(30) Foreign Application Priority Data

Jun. 17, 2000 (DE) .......................................... 100 30 013
Mar. 29, 2001 (DE) .......................................... 101 15 589

(51) Int. Cl.[7] .............................. G02B 6/32; G02B 6/00; G02B 21/00
(52) U.S. Cl. ...................... 385/33; 385/123; 385/122; 385/92; 385/93; 385/38; 385/43; 362/551; 362/553; 362/559; 359/368
(58) Field of Search ................................. 385/123, 124, 385/125, 92, 93, 94, 33, 38, 122, 43; 362/551, 553, 559; 359/368

(56) References Cited

U.S. PATENT DOCUMENTS

| | | | | |
|---|---|---|---|---|
| 3,720,822 A | | 3/1973 | Rochester et al. | 240/1.3 |
| 5,350,921 A | * | 9/1994 | Aoyama et al. | 250/311 |
| 5,799,126 A | * | 8/1998 | Nagatani et al. | 385/146 |
| 5,802,236 A | * | 9/1998 | DiGiovanni et al. | 385/127 |
| 5,967,653 A | * | 10/1999 | Miller et al. | 362/580 |
| 6,097,870 A | | 8/2000 | Ranka et al. | 385/127 |
| 6,154,310 A | | 11/2000 | Galvanauskas et al. | 359/328 |
| 6,514,784 B1 | * | 2/2003 | Dubowski | 438/35 |

FOREIGN PATENT DOCUMENTS

| | | | |
|---|---|---|---|
| DE | 198 53 669 | 5/1999 | ............ 385/92 X |
| EP | 0 495 930 | 4/1999 | ............ 385/92 X |
| WO | 00/04613 | 1/2000 | ............ 385/92 X |

OTHER PUBLICATIONS

U.S. patent application Publication; (Knebel) U.S.2003/0030901A1; published Feb. 13, 2003.*
U.S. patent application Publication, (Birk et. al.) U.S. 2002/0009260 A1; published Jan. 24, 2002.*
U.S. patent application Publication, (Birk et. al.) U.S. 2002/0006264 A1, published Jan. 17, 2002.*
U.S. patent application Publication, (Birk et. al.) U.S. 2002/0018290 A1, published Feb. 14, 2002.*

* cited by examiner

Primary Examiner—Brian Healy
(74) Attorney, Agent, or Firm—Foley & Lardner

(57) ABSTRACT

The invention discloses an illuminating device (1) having a laser (3) that emits a light beam (7), which is directed onto a microstructured optical element (13) that spectrally broadens the light from the laser. The laser (3) and the microstructured optical element (13) are arranged within the casing.

32 Claims, 8 Drawing Sheets

ILLUMINATING DEVICE AND MICROSCOPE

CROSS REFERENCE TO RELATED APPLICATIONS

This invention claims priority of the German patent application 100 30 013.8 and 101 15 589.1 which are incorporated by reference herein.

FIELD OF THE INVENTION

The invention relates to an illuminating device having a laser that emits a light beam, which is directed onto a microstructured optical element that spectrally broadens the light from the laser.

BACKGROUND OF THE INVENTION

Laid-open patent specification DE 198 53 669 A1 discloses an ultrashort-pulse source with controllable multiple-wavelength output, which is used especially in a multiphoton microscope. The system has an ultrashort-pulse laser for producing ultrashort optical pulses of a fixed wavelength and at least one wavelength conversion channel.

U.S. Pat. No. 6,097,870 discloses an arrangement for generating a broadband spectrum in the visible and infrared spectral range. The arrangement is based on a microstructured fibre, into which the light from a pump laser is injected. The pump light is broadened in the microstructured fibre by non-linear effects. So-called photonic band gap material or "photonic crystal fibres", "holey fibres" or "microstructured fibres" are also employed as microstructured fibres. Configurations as a so-called "hollow fibre" are also known.

Another arrangement for generating a broadband spectrum is disclosed in the publication by Birks et al.: "Supercontinuum generation in tapered fibres", Opt. Lett. Vol. 25, p.1415 (2000). A conventional optical fibre having a fibre core, which has a taper at least along a subsection, is used in the arrangement. Optical fibres of this type are known as so-called "tapered fibres".

An optical amplifier, whose gain can be adjusted as a function of the wavelength, is known from the PCT application with the publication number WO 00/04613. The said publication also discloses a fibre light source based on this principle.

Arc lamps are known as broadband light sources, and are employed in many areas. One example is the U.S. Pat. No. 3,720,822 "XENON PHOTOGRAPHY LIGHT", which discloses a xenon arc lamp for illumination in photography.

Especially in microscopy, universal illuminating devices with high luminance are important for the illumination of microscopic preparations. In scanning microscopy, a sample is scanned with a light beam. To that end, lasers are often used as the light source. For example, an arrangement having a single laser which emits several laser lines is known from EP 0 495 930: "Konfokales Mikroskopsystem für Mehrfarbenfluoreszenz" [confocal microscope system for multicolour fluorescence]. Mixed gas lasers, especially ArKr lasers, are mainly used for this at present. Examples of samples which are studied include biological tissue or sections prepared with fluorescent dyes. In the field of material study, illumination light reflected from the sample is often detected. Solid-state lasers and dye lasers, as well as fibre lasers and optical parametric oscillators (OPOs), upstream of which a pump laser is arranged, are also frequently used.

The illuminating devices known from the prior art have several disadvantages. The known broadband illuminating devices mostly have a low luminance compared with laser-based illuminating devices, whereas the latter provide the user only with discrete wavelength lines whose spectral position and width can be adjusted only to a small extent, if at all. Owing to this limitation of the working spectrum, the known illuminating devices are not flexibly usable.

By using microstructured fibres, as described in the previously mentioned U.S. Pat. No. 6,097,870, a broad continuous wavelength spectrum is accessible. Arrangements of the disclosed type, however, are difficult to handle, inflexible and susceptible to interference, especially because of the complexity of the individual optical components and their relative adjustment.

SUMMARY OF THE INVENTION

It is an object of the invention to provide an illuminating device which is easy to handle, reliable, flexible and not susceptible to interference.

The object is achieved by an illuminating device comprising: a laser that emits a light beam, a microstructured optical element on which the light beam is directed and wherein the microstructured optical element spectrally broadens the light beam and a casing, defining an exit opening from which the spectrally broadened light beam emerges and wherein the laser and the microstructured optical element are arranged within the casing.

A further object of the invention is to create microscope with an illumination device for illuminating a preparation which provides an illumination encompassing a numerous selectable spectral regions.

The aforesaid object is achieved by a microscope comprising: an illuminating device for illuminating a preparation having a laser that emits a light beam and a microstructured optical element on which the light beam is directed, wherein the microstructured optical element spectrally broadens the light beam.

The invention has the advantage that it is universally usable, easy to handle and flexible, and furthermore provides light from a wide wavelength range.

In a preferred configuration, the illuminating device has a casing with a light exit opening, from which the spectrally broadened light emerges. This has the advantage that, in particular, the optical components are protected against external effects and especially against dirt.

A configuration variant in which a lens, which shapes the spectrally broadened light into a beam, is arranged downstream of the microstructured optical element, is especially advantageous. This lens is preferably located inside the casing, immediately in front of the light exit opening. With regard to beam safety, a warning light preferably fitted to the casing, which indicates the activity of the illuminating device to the user, is provided.

All common laser types may be used as the laser. In a preferred configuration, the laser is a short-pulse laser, for example a mode-coupled or mode-locked solid-state laser, which emits light pulses with a period of from 100 fs to 10 ps.

An embodiment of the illuminating device which contains an instrument for varying the power of the spectrally broadened light is especially preferred. In this case, it is more particularly advantageous to configure the illuminating device in such a way that the power of the spectrally broadened light can be varied or can be fully stopped-out with respect to at least one selectable wavelength or at least one selectable wavelength range.

Acousto-optical or electro-optical elements, such as e.g. acousto-optical tunable filters (AOTFs), are preferably usable as the instrument for varying the power of the spectrally broadened light. It is likewise possible to use dielectric filters or colour filters, which are preferably arranged in cascade. Particular flexibility is achieved if the filters are fitted in revolvers or in slide mounts, which allow easy insertion into the beam path of the spectrally broadened light.

In another configuration, provision is made for the spectrally broadened light to be spectrally resolved in a spatial fashion, in order to make it possible to suppress or fully stop-out spectral components with a suitable variable aperture arrangement or filter arrangement, and subsequently recombine the remaining spectral components to form a beam. A prism or a grating, for example, may be used for the spatial spectral resolution.

To vary the power of the spectrally broadened light, in another alternative embodiment, a Fabry-Perot filter is provided. LCD filters can also be used.

An embodiment which has, directly on the casing, operating elements for adjusting the light power and the spectral composition of the spectrally broadened light, is especially advantageous. In another embodiment, these parameters are adjusted on an external control panel or on a PC, and the adjustment data is transmitted in the form of electrical signals to the illuminating device, or to the instrument for varying the power of the spectrally broadened light. Adjustment using sliders, which are shown on a display and, for example, can be operated using a computer mouse, is particularly clear.

According to the invention, it has been discovered that the divergence and the diameter of the light beam, which is emitted by the laser and is directed onto the microstructured optical element, has a considerable influence on the spectral distribution within the spectrally broadened light. In a particularly preferred and flexible configuration, the illuminating device contains a focusing lens which focuses the light beam from the laser onto the microstructured optical element. Embodiment of the focusing lens as a variable lens, for example as a zoom lens, is particularly advantageous.

In the illuminating device, an instrument is preferably provided which permits analysis of the broadened-wavelength light, in particular with regard to the spectral composition and the luminance. The analysis instrument is arranged in such a way that part of the spectrally broadened light is split off, for example with the aid of a beam splitter, and fed to the analysis instrument. The analysis instrument is preferably a spectrometer. It contains, for example, a prism or a grating for the spatial spectral resolution, and a CCD element or a multichannel photomultiplier as the detector. In another variant, the analysis instrument contains a multiband detector. Semiconductor spectrometers can also be employed.

To establish the power of the spectrally broadened light, the detectors are configured in such a way that an electrical signal, which is proportional to the light power and can be evaluated by electronics or a computer, is generated.

The embodiment which contains a display for the power of the spectrally broadened light and/or for the spectral composition of the spectrally broadened light is more particularly advantageous. The display is preferably fitted directly on the casing or to the control panel. In another embodiment, the monitor of a PC is used for displaying the power and/or the spectral composition.

In a preferred configuration of the scanning microscope, the microstructured optical element is constructed from a plurality of micro-optical structure elements, which have at least two different optical densities. A configuration in which the optical element contains a first region and a second region, the first region having a homogeneous structure and a microstructure comprising micro-optical structure elements being formed in the second region, is more particularly preferred. It is furthermore advantageous if the first region encloses the second region. The micro-optical structure elements are preferably cannulas, webs, honeycombs, tubes or cavities.

In another configuration, the microstructured optical element consists of adjacent glass or plastic material and cavities. A particularly preferred alternative embodiment is one in which the microstructured optical element consists of photonic band gap material and is configured as an optical fibre, an optical diode, which suppresses back-reflection of the light beam from the laser due to the ends of the optical fibre, being preferably arranged between the laser and the optical fibre.

A more particularly preferred alternative embodiment, which is simple to implement, contains a conventional optical fibre having a fibre core diameter of approximately 9 µm, which has a taper at least along a subsection, as the microstructured optical element. Optical fibres of this type are known as so-called "tapered fibres". The optical fibre preferably has an overall length of 1 m and a taper over a length of from 30 mm to 90 mm. The diameter of the optical fibre, in a preferred configuration, is approximately 2 □m in the region of the taper. The fibre core diameter is correspondingly in the nanometer range.

The illuminating device can be used more particularly for the illumination of a microscopic sample, especially in a scanning microscope or a confocal scanning microscope.

BRIEF DESCRIPTION OF THE DRAWINGS

The subject-matter of the invention is diagrammatically represented in the drawing and will be described below with the aid of the figures, in which.

DETAILED DESCRIPTION OF THE INVENTION

Figure 1:
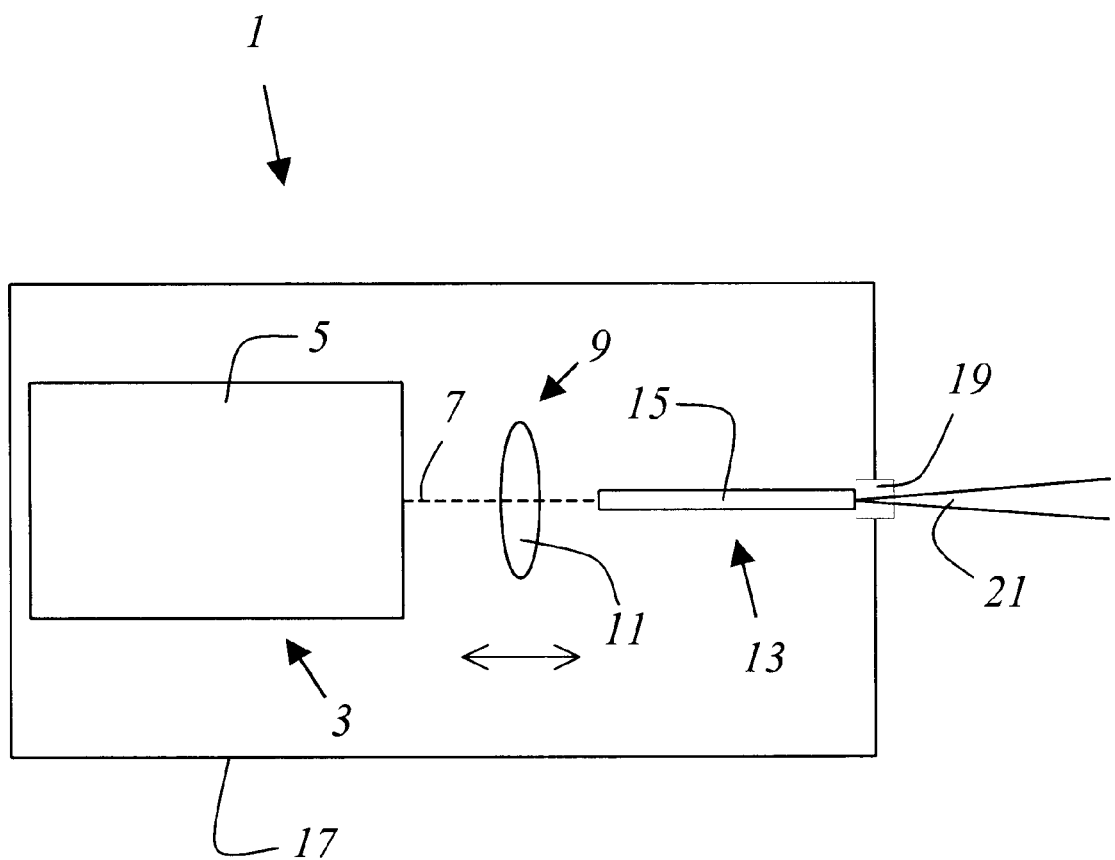
FIG. 1 shows an illuminating device according to the invention.

FIG. 1 shows an illuminating device 1, which contains a laser 3 that is embodied as a diode laser-pumped, mode-locked Ti:sapphire laser 5 and emits a pulsed light beam 7, which is shown in dashes. The period of the light pulse is approximately 100 fs with a repetition rate of approximately 80 MHz. The light beam 7 is focused by the focusing lens 9, which is configured as a zoom lens 11 and is arranged displaceably along the propagation direction of the light beam, onto a microstructured optical element 13, which consists of a crystal 15 of photonic band gap material. In the microstructured optical element, the light from the laser is spectrally broadened. All the components are located in a casing 17 having a light exit opening 19, through which the spectrally broadened light 21 leaves the casing as a divergent beam. The spectrum of the spectrally broadened light 21 extends from approximately 300 nm to 1600 nm, the light power being substantially constant over the entire spectrum.

Figure 2:
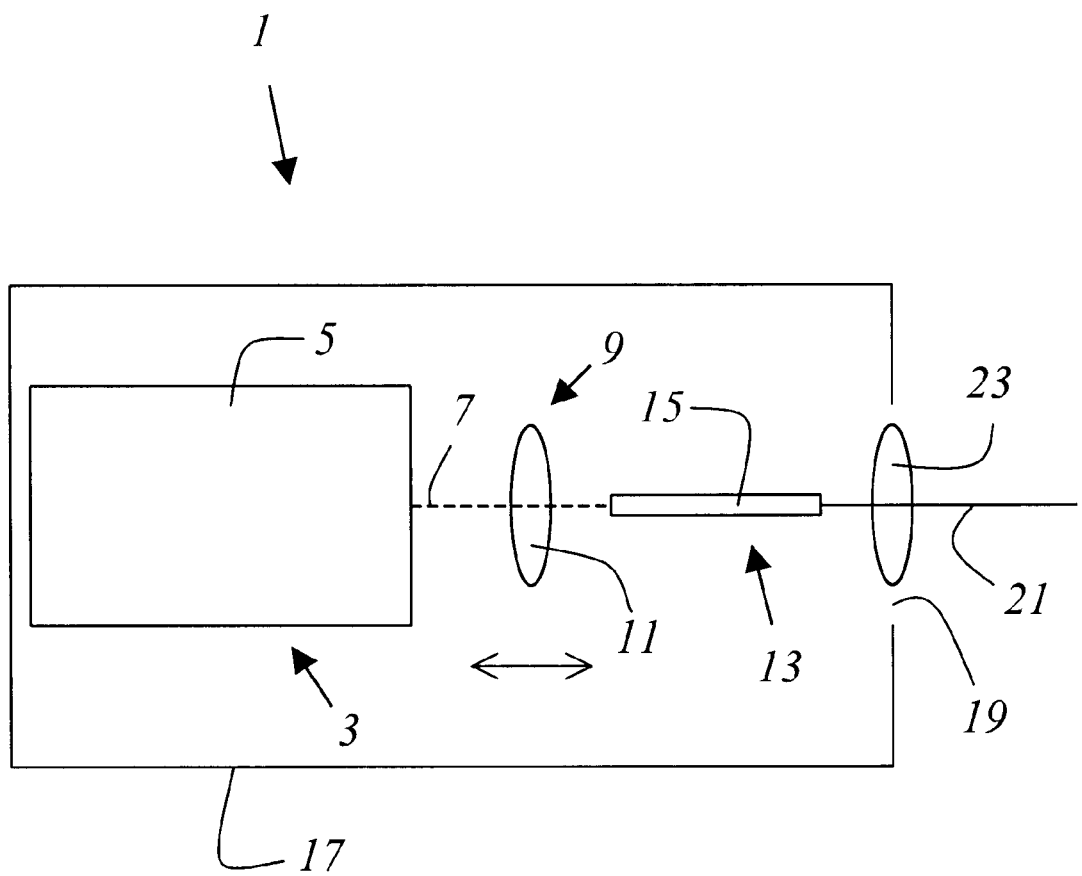
FIG. 2 shows another illuminating device according to the invention.

FIG. 2 shows an exemplary embodiment similar to the embodiment represented in FIG. 1. In the light exit opening 19, there is a lens 23 which shapes the spectrally broadened light 21 to form a spectrally broadened light beam 25 in such a way that the latter is collimated. The lens 23 is embodied as a variable lens.

Figure 3:
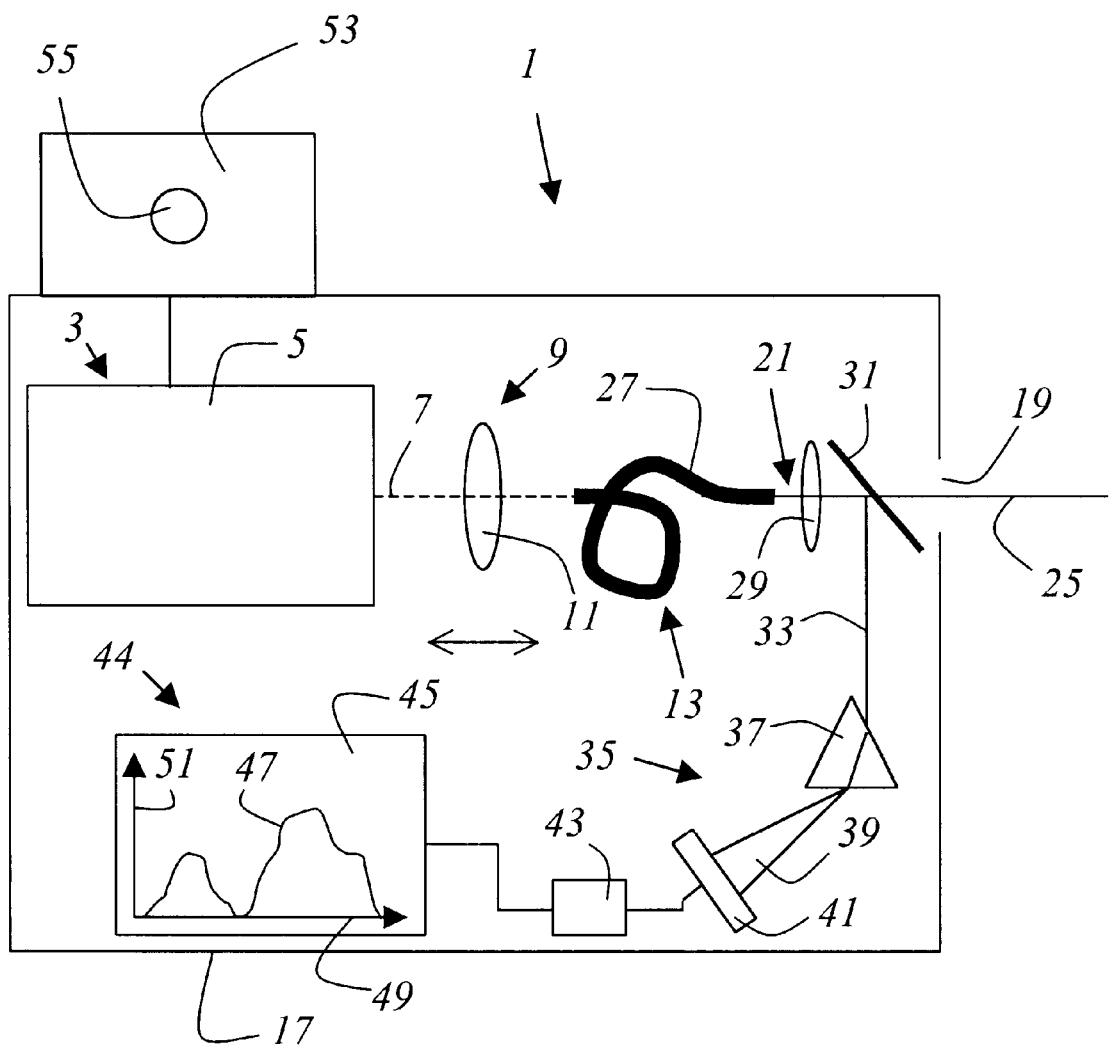
FIG. 3 shows an illuminating device according to the invention with a spectrometer and a display.

FIG. 3 shows an exemplary embodiment similar to the embodiment represented in FIG. 1. The microstructured optical element 13 consists of photonic band gap material and is designed as an optical fibre 27. The spectrally broadened light 21 emerging from the optical fibre 27 is shaped with the aid of the lens 29 to form a collimated, spectrally broadened light beam 25. Using the beam splitter 31, a subsidiary light beam 33 of the spectrally broadened light beam 25 is split off and diverted onto an analysis instrument 35. The latter contains a prism 37 which spectrally spreads the subsidiary light beam 33 in a spatial fashion to form a light cone 39 that diverges in the spreading plane, and is directed onto a photodiode linear array 41 for detecting the light. The photodiode linear array 41 generates electrical signals, which are proportional to the power of the light of the spectral range in question and are fed to a processing unit 43. In the latter, the signals are processed and forwarded to a display 44. The latter consists of an LCD display 45, which is fitted to the casing and on which the composition of the spectrally broadened light 21 is shown in the form of a graph 47 within a coordinate system having two axes 49, 51. The wavelength is plotted on the axis 49 and the power of the light is plotted on the axis 51. The illuminating device which is shown contains a control panel 53 with a control knob 55 that is used to adjust the output power of the Ti:sapphire laser 5. By adjusting the power of the light beam 7, it is possible to vary the power of the spectrally broadened light 21.

Figure 4:
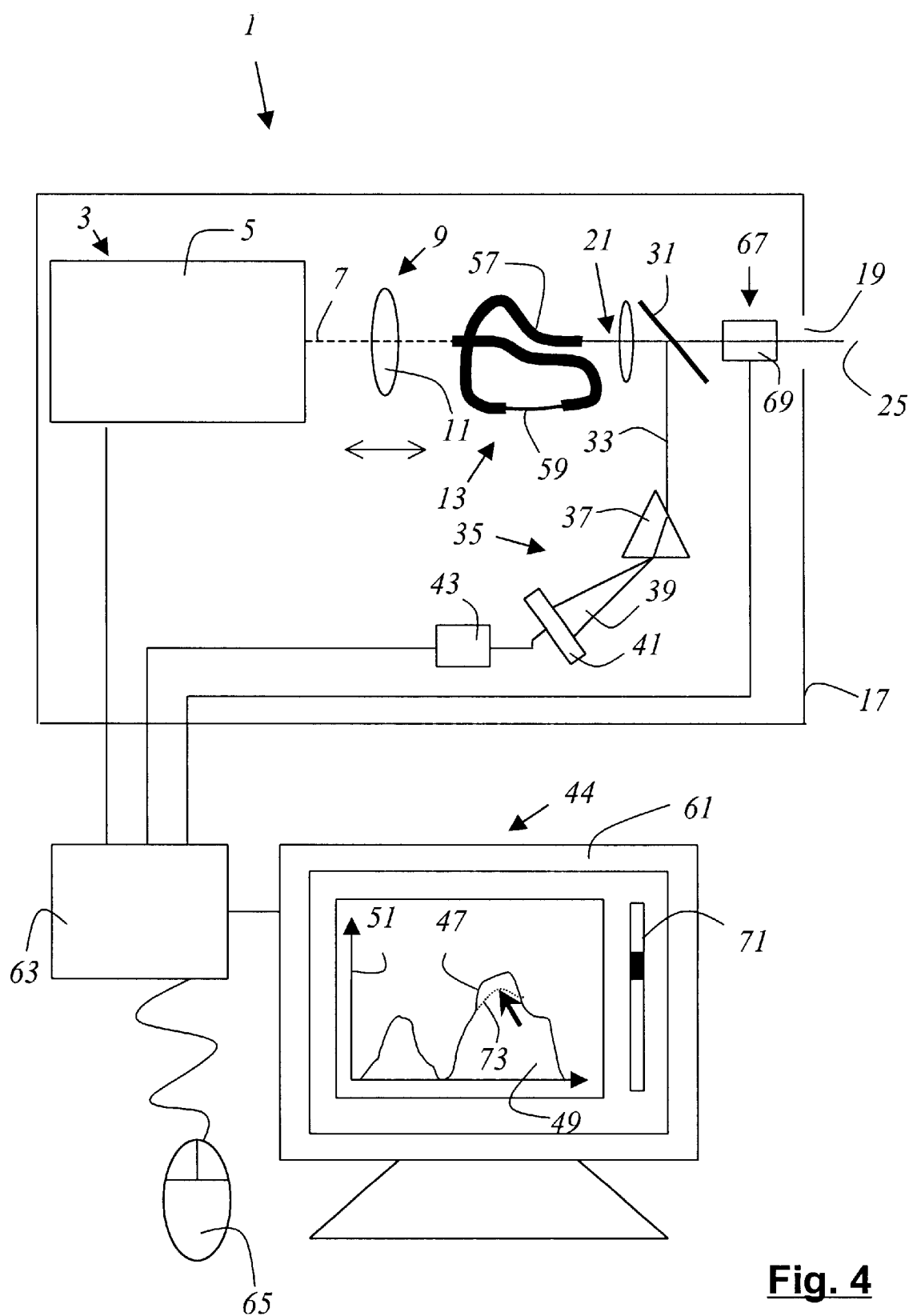
FIG. 4 shows an illuminating device according to the invention with a power meter and a display.

FIG. 4 shows an illuminating device 1 whose basic structure corresponds to the illuminating device represented in FIG. 3. The microstructured optical element 13 consists of an optical fibre 57 having a taper 59. A computer 63 is used as the control panel. The monitor 61 of the computer 63, to which the processed electrical signals from the processing unit are fed, is used as the display 44 for the spectral composition. The representation is carried out in a similar fashion to the coordinate representation shown in FIG. 3. In accordance with the user's instructions, the computer 63 controls an instrument for varying the power 67 of the spectrally broadened light 21. It is designed as an AOTF 69 (acousto-optical tunable filter). A system for controlling the output power of the laser 3 by means of the computer is furthermore provided. The user makes adjustments with the aid of the computer mouse 65. A slider 71, which is used for adjusting the overall power of the spectrally modified light 21, is represented on the monitor 61. Clicking the graph 47 and moving the computer mouse 65 at the same time generates a dotted graph 73, which can be deformed in accordance with the movement of the computer mouse 65.

As soon as the computer mouse 65 is clicked again, the computer 63 drives the instrument for varying the power 67 in such a way as to produce the spectral composition preselected by the dotted graph 73.

Figure 5:
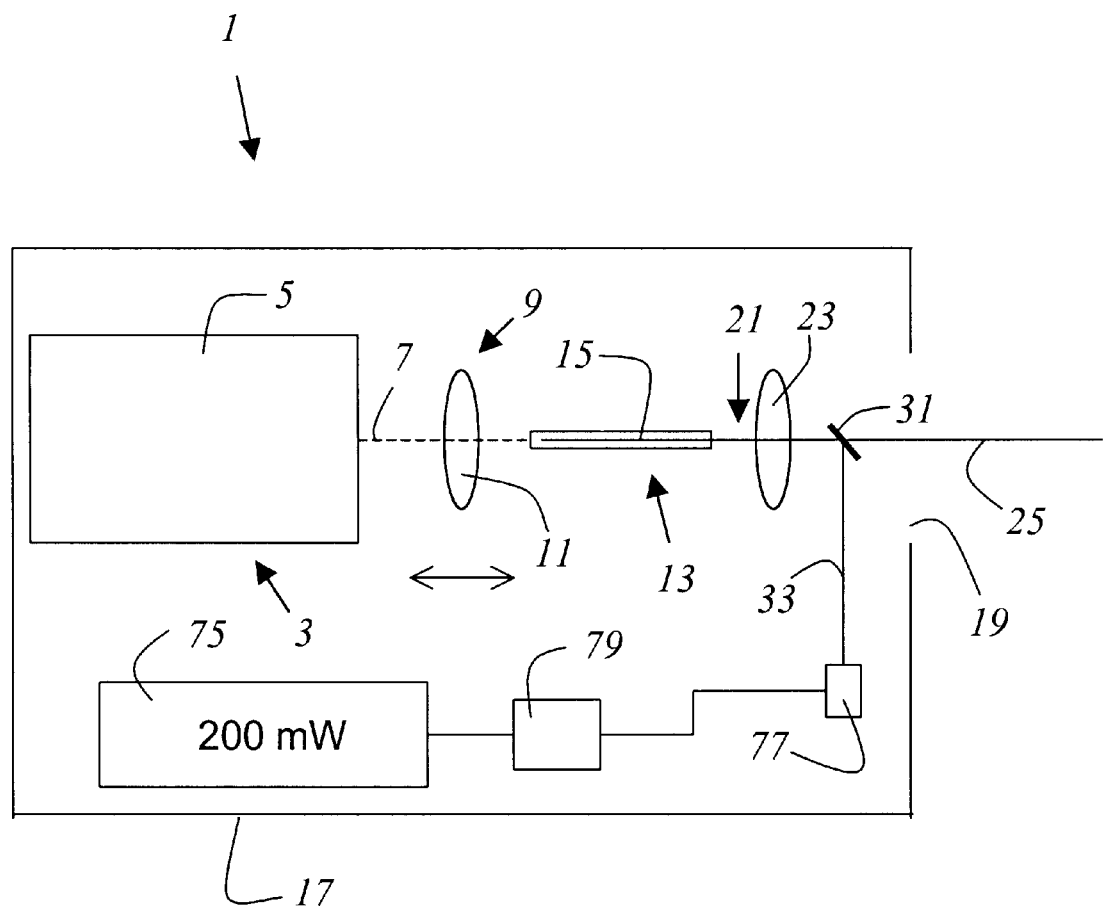
FIG. 5 shows an illuminating device according to the invention with an instrument for varying the power.

FIG. 5 shows an illuminating device as in FIG. 1, which also contains a display 75 for the power of the spectrally broadened light 21, which is embodied as a purely numerical display. Using the beam splitter 31, a subsidiary beam 33 is split off from the spectrally broadened light 21 and is diverted onto a photomultiplier 77, which generates an electrical signal proportional to the power of the incident subsidiary beam 33. This signal is processed in the processing unit 79 and delivered to the display 75.

Figure 6:
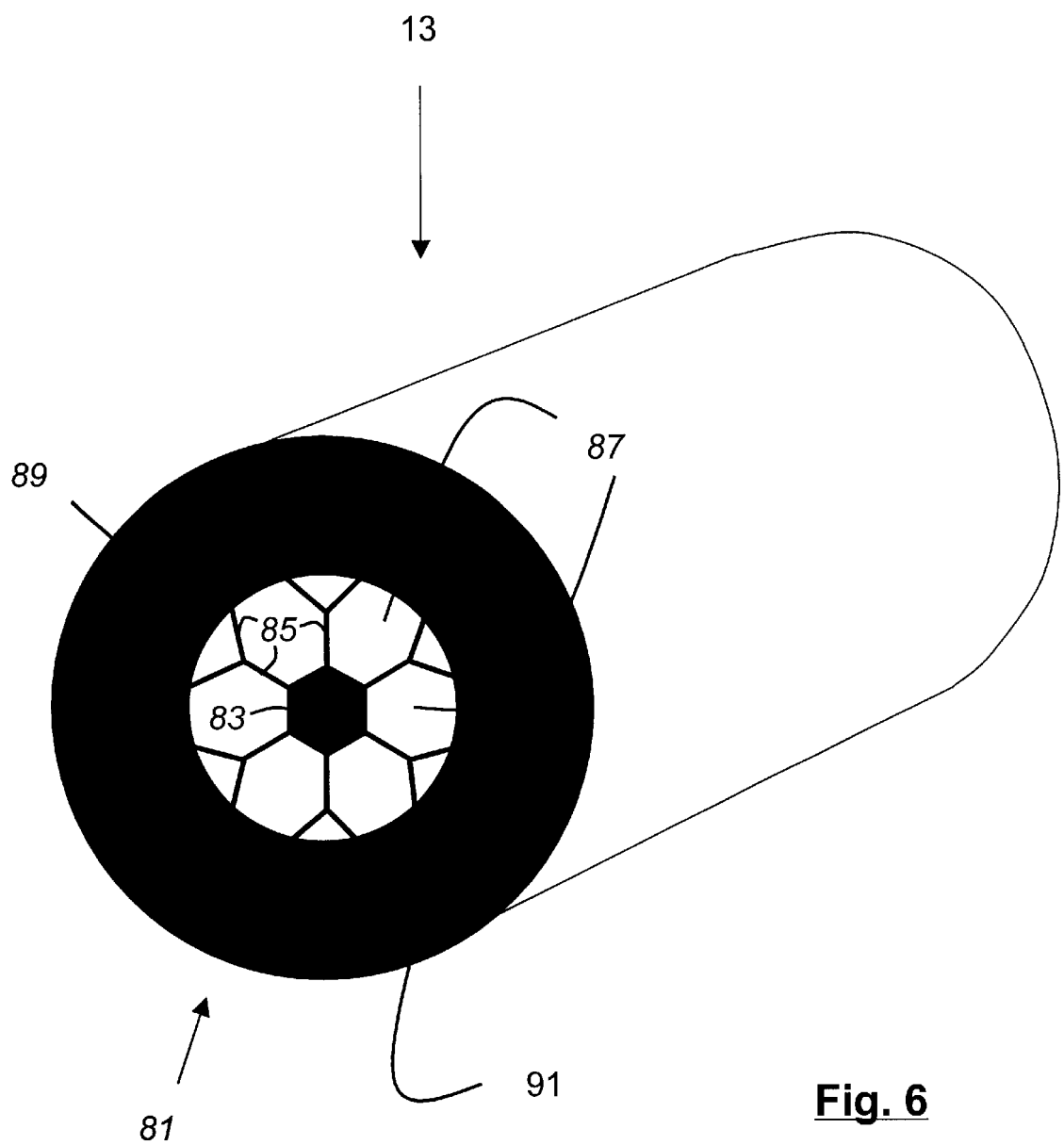
FIG. 6 shows an embodiment of the microstructured optical element, FIG. 7 schematically shows a confocal scanning microscope.

FIG. 6 shows an embodiment of the microstructured optical element 13. It consists of photonic band gap material, which has a special honeycombed microstructure 81. The honeycombed structure that is shown is particularly suitable for generating broadband light. The diameter of the glass inner cannula 83 is approximately 1.9 □m. The inner cannula 83 is surrounded by glass webs 85. The glass webs 85 form honeycombed cavities 87. These micro-optical structure elements together form a second region 89, which is enclosed by a first region 91 that is designed as a glass cladding.

Figure 7:
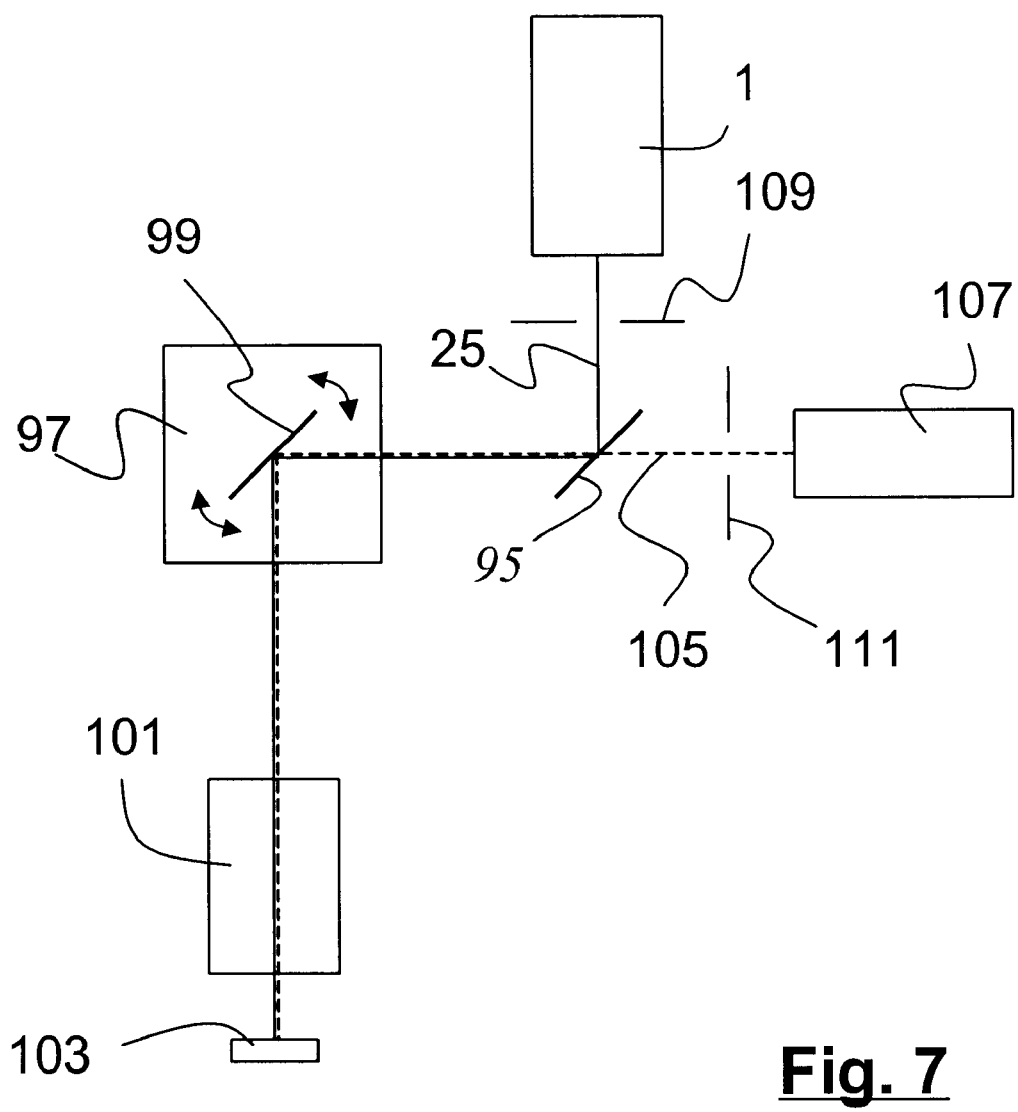

FIG. 7 schematically shows a confocal scanning microscope 93. The light beam 25 coming from the illuminating device 1 is reflected by a beam splitter 95 to the scanning module 97, which contains a cardan-suspended scanning mirror 99 that guides the light beam 25 through the microscope lens 101 and over or through the preparation 103. In the case of non-transparent preparations 103, the light beam 25 is guided over the object surface. In the case of biological preparations 103 or transparent preparations 103, the light beam 25 can also be guided through the preparation 103. This means that various focal planes of the preparation 103 are scanned successively by the light beam 25. Subsequent combination then gives a three-dimensional image of the preparation. The light beam 25 coming from the illuminating device 1 is represented in the figure as a solid line. The light 105 leaving the preparation 103 goes through the microscope lens 101 and, via the scanning module 97, to the beam splitter 95, then it passes through the latter and strikes the detector 107, which is embodied as a photomultiplier. The light 105 leaving the preparation 103 is represented as a dashed line. In the detector 107, electrical detection signals proportional to the power of the light 105 leaving the preparation 103 are generated and processed. The illumination pinhole 109 and the detection pinhole 111, which are normally provided in a confocal scanning microscope, are indicated schematically for the sake of completeness. For better clarity, however, a few optical elements for guiding and shaping the light beams are omitted. These are adequately known to a person skilled in this field.

Figure 8:
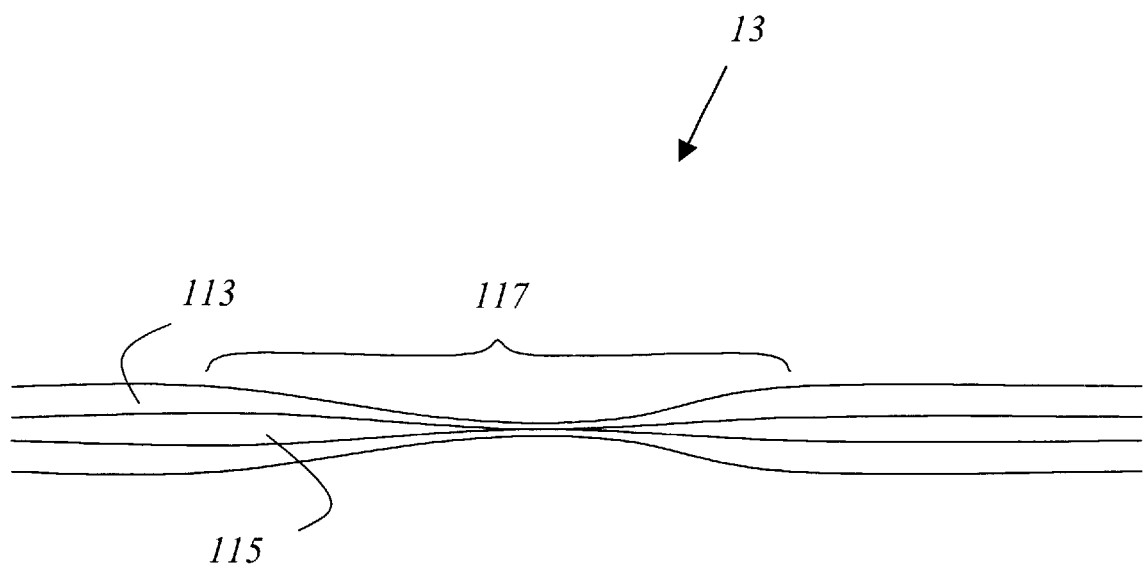
FIG. 8 shows another embodiment of the micro structured optical element.

FIG. 8 schematically shows an embodiment of the microstructured optical element 13. In this embodiment, the microstructured optical element 13 consists of conventional optical fibre 113 having an external diameter of 125 □m and a fibre core 115, which has a diameter of 6 □m. In the region of a 300 mm long taper 117, the external diameter of the optical fibre 113 is reduced to 1.8 □m. In this region, the diameter of the fibre core 115 is then only fractions of a micrometer.

The invention has been described with reference to a particular embodiment. It is, however, obvious that modifications and amendments may be made without thereby departing from the scope of protection of the following claims.

Parts List 1 illuminating device
3 laser
5 Ti:sapphire laser
7 light beam
9 focusing lens
11 zoom lens
13 microstructured optical element
15 crystal
17 casing
19 light exit opening
21 spectrally broadened light
23 lens
25 spectrally broadened light
27 optical fibre
29 lens
31 beam splitter
33 subsidiary light beam
35 analysis instrument
37 prism
39 light cone
41 photodiode linear array
43 processing unit
44 display
45 LCD display
47 graph
49 axis
51 axis
53 control panel
55 control knob
57 optical fibre
59 taper
61 monitor
63 computer
65 computer mouse
67 instrument for varying the power
69 AOTF
71 slider
73 graph
75 display
77 photomultiplier
79 processing unit
81 microstructure
83 glass inner cannula
85 glass web
87 cavities
89 second region
91 first region
93 confocal scanning microscope
95 beam splitter
97 scanning module
99 scanning mirror
101 microscope lens
103 preparation
105 light leaving the preparation
107 detector
109 illumination pinhole
111 detection pinhole
113 optical fibre
115 fibre core
117 taper

What is claimed is:

1. An illuminating device comprising: a laser that emits a light beam, a microstructured optical element on which the light beam is directed and wherein the microstructured optical element spectrally broadens the light beam and a casing, defining an exit opening from which the spectrally broadened light beam emerges and wherein the laser and the microstructured optical element are arranged within the casing.

2. An illuminating device according to claim 1, further comprising a lens arranged downstream of the microstructured optical element for shaping the spectrally broadened light beam.

3. An illuminating device according to claim 1, further comprising an instrument for varying the power of the spectrally broadened light beam.

4. An illuminating device according to claim 1, further comprising an instrument for varying the power of the spectrally broadened light beam within a selectable wavelength range.

5. An illuminating device according to claim 1, further comprising a control panel for selecting the power of the spectrally broadened light.

6. An illuminating device according to claim 1, further comprising a focusing lens, which focuses the light beam emitted by the laser onto the microstructured optical element.

7. An illuminating device according to claim 1 further comprising an analysis instrument and a beam splitter directing a subsidiary beam of the spectrally broadened light beam onto the analysis instrument.

8. An illuminating device according to claim 7, wherein the analysis instrument comprises at least one of a spectrometer and a power meter.

9. An illuminating device according to claim 7, further comprising a display for indicating the power of the spectrally broadened light.

10. An illuminating device according to claim 7, further comprising a display for indicating the spectral composition of the spectrally broadened light beam.

11. An illuminating device according to claim 1, wherein the microstructured optical element contains a plurality of micro-optical structure elements, which have at least two different optical densities.

12. An illuminating device according to claim 11, wherein the microstructured optical element comprises a first region having a homogeneous structure and a second region formed by micro-optical structure elements.

13. An illuminating device according to claim 12, wherein the first region encloses the second region.

14. An illuminating device according to claim 11, wherein the microstructured optical element comprises at least one of adjacent glass, plastic material, cavities, cannulas, webs, honeycombs and tubes.

15. An illuminating device according to claim 11, wherein the microstructured optical element comprises photonic band gap material.

16. An illuminating device according to claim 1, wherein the microstructured optical element is configured as an optical fiber.

17. An illuminating device comprising: a laser that emits a light beam, a tapered optical fiber into which the light beam is coupled and wherein the tapered optical fiber spectrally broadens the light beam and a casing, defining an exit opening from which the spectrally broadened light beam emerges and wherein the laser and the tapered optical fiber are arranged within the casing.

18. An illuminating device according to claim 17, further comprising a lens arranged downstream of the tapered optical fiber for shaping the spectrally broadened light beam.

19. An illuminating device according to claim 17, further comprising an instrument for varying the power of the spectrally broadened light beam.

20. An illuminating device according to claim 17, further comprising an instrument for varying the power of the spectrally broadened light beam within a selectable wavelength range.

21. An illuminating device according to claim 17, further comprising a control panel for selecting the power of the spectrally broadened light.

22. An illuminating device according to claim 17, further comprising a focusing lens, which focuses the light beam emitted by the laser into the tapered optical fiber.

23. An illuminating device according to claim 17, further comprising an analysis instrument and a beam splitter directing a subsidiary beam of the spectrally broadened light beam onto the analysis instrument.

24. An illuminating device according to claim 23, wherein the analysis instrument comprises at least one of a spectrometer and a power meter.

25. An illuminating device according to claim 23, further comprising a display for indicating the power of the spectrally broadened light.

26. An illuminating device according to claim 23, further comprising a display for indicating the spectral composition of the spectrally broadened light beam.

27. A microscope comprising:

an illuminating device for illuminating a preparation having a laser that emits a light beam and a microstructured optical element on which the light beam is directed, wherein the microstructured optical element spectrally broadens the light beam.

28. A microscope according to claim 27, wherein the microstructured optical element comprises photonic band gap material.

29. A microscope comprising:

an illuminating device for illuminating a preparation having a laser that emits a light beam and a tapered optical fiber on which the light beam is directed, wherein the tapered optical fiber spectrally broadens the light beam.

30. A confocal scanning microscope comprising:

an illuminating device for illuminating a preparation having a laser that emits a light beam and a microstructured optical element on which the light beam is directed, wherein the microstructured optical element spectrally broadens the light beam.

31. A confocal scanning microscope according to claim 27, wherein the microstructured optical element comprises photonic band gap material.

32. A confocal scanning microscope comprising:

an illuminating device for illuminating a preparation having a laser that emits a light beam and a tapered optical fiber on which the light beam is directed, wherein the tapered optical fiber spectrally broadens the light beam.

* * * * *